United States Patent
Ohba et al.

(10) Patent No.: US 6,500,069 B1
(45) Date of Patent: *Dec. 31, 2002

(54) IMAGE PROCESSOR, IMAGE PROCESSING METHOD, GAME MACHINE AND RECORDING MEDIUM

(75) Inventors: Noriyoshi Ohba, Tokyo (JP); Kenichi Ono, Tokyo (JP)

(73) Assignee: Kabushiki Kaisha Sega Enterprises, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,267

(22) PCT Filed: Jun. 5, 1997

(86) PCT No.: PCT/JP97/01912

§ 371 (c)(1),
(2), (4) Date: Jan. 30, 1998

(87) PCT Pub. No.: WO97/46970

PCT Pub. Date: Dec. 11, 1997

(30) Foreign Application Priority Data

Jun. 5, 1996 (JP) ............................................. 8-143337

(51) Int. Cl.⁷ .............................. A63F 9/22; G09G 5/08
(52) U.S. Cl. ......................... 463/31; 463/36; 345/145; 345/157
(58) Field of Search ............................ 463/30, 31, 32, 463/33, 7, 36, 9; 345/145, 146, 157, 977

(56) References Cited

U.S. PATENT DOCUMENTS

| | | | |
|---|---|---|---|
| 4,600,200 A | | 7/1986 | Oka et al. |
| 5,261,820 A | * | 11/1993 | Slye et al. ................... 463/43 |
| 5,415,549 A | | 5/1995 | Logg |
| 5,588,914 A | * | 12/1996 | Adamczyk ................... 463/32 |
| 5,704,837 A | | 1/1998 | Iwasaki et al. |
| 5,734,807 A | * | 3/1998 | Sumi ........................... 463/32 |

(List continued on next page.)

FOREIGN PATENT DOCUMENTS

| | | |
|---|---|---|
| EP | 0 714 685 A1 | 6/1996 |
| JP | 6-274577 | 9/1994 |
| JP | 07-075689 | 3/1995 |
| JP | 8-117440 | 5/1996 |
| WO | WO 94/08309 | 4/1994 |
| WO | WO 94/22544 | 10/1994 |
| WO | WO 95/35140 | 12/1995 |

OTHER PUBLICATIONS

Game Revolution, Daggerfall Review website by George la Tourette, Jr. pp. 1–4. Printed off the Internet at: http://www.game–revolution.com/games/pc/daggerfall.htm, Nov. 1996.*

Adventure Review, Daggerfall Review website by Andy Backer, pp. 1–5. Printed off the Internet at http://www.cdmag.com/adventure_vault/daggerfall_review, Dec. 1996.*

Ollinger, J., "Microsoft Space Simulator by BAO," *Games Bytes Magazine*, Online! (1994).

*Primary Examiner*—Jessica Harrison
(74) *Attorney, Agent, or Firm*—Finnegan, Henderson, Farabow, Garrett & Dunner, L.L.P.

(57) ABSTRACT

In a simulation game machine for play on the basis of images of three-dimensionally constituted terrain features and characters which are represented as if viewed from a prescribed camera within a virtual space, allows the viewing point to be shifted in three dimensions while looking over a stage, thereby enhancing the interest of the game. Upon entering a topographical mapping data check (ST1), the viewing point is shifted while panning and zooming in movie-like fashion along a predetermined path (ST2), and messages disposed along the path are displayed (ST4).

7 Claims, 13 Drawing Sheets

U.S. PATENT DOCUMENTS

| | | | |
|---|---|---|---|
| 5,808,614 A | * 9/1998 | Nagahara et al. | 345/355 |
| 5,830,066 A | * 11/1998 | Goden et al. | 463/33 |
| 5,920,304 A | * 7/1999 | Berstis | 345/145 |
| 5,952,995 A | * 9/1999 | Barnes | 345/145 |
| 5,995,102 A | * 11/1999 | Rosen et al. | 345/145 |
| 6,144,378 A | * 11/2000 | Lee | 345/339 |
| 6,166,718 A | * 12/2000 | Takeda | 345/145 |

* cited by examiner

F I G. 11
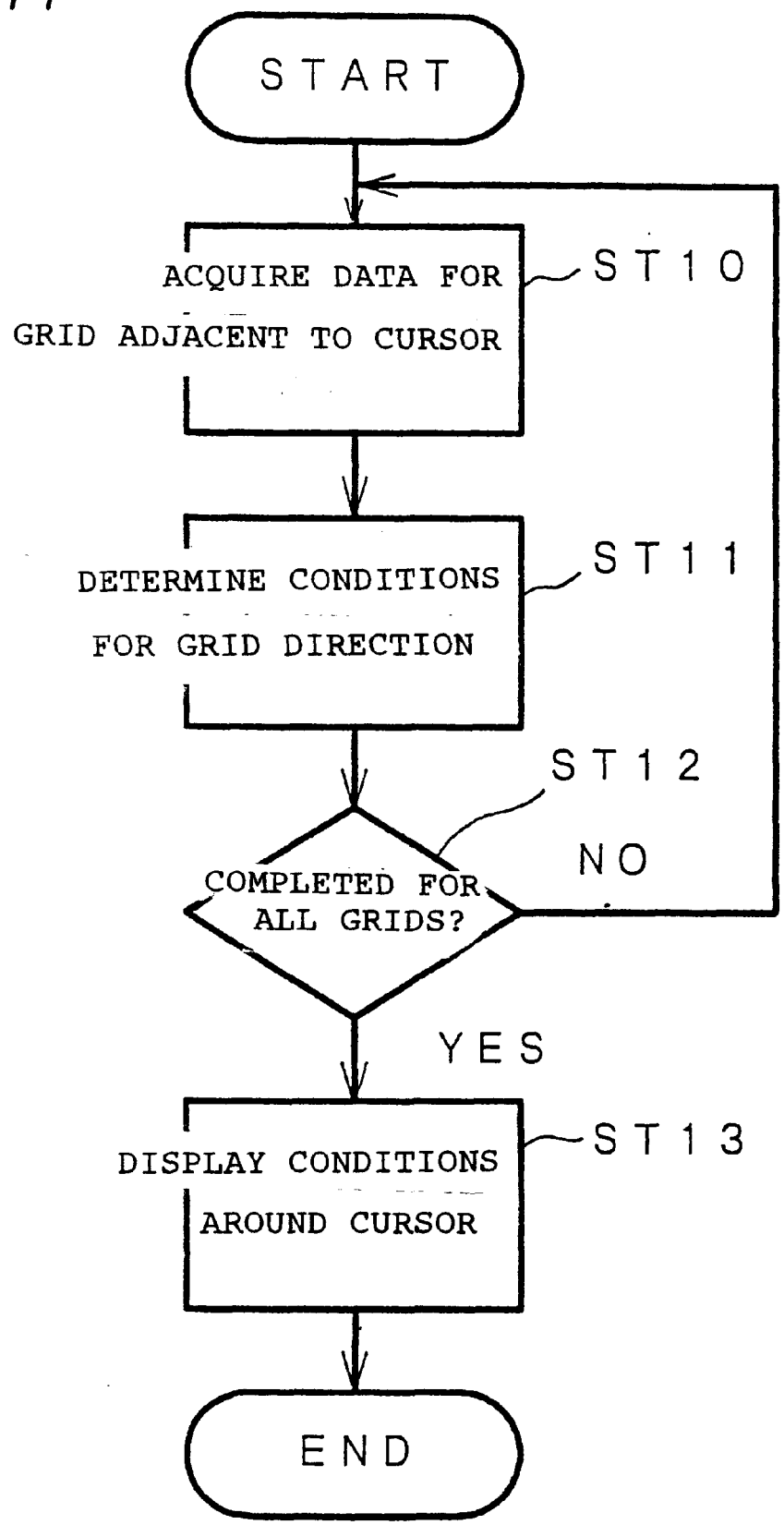

IMAGE PROCESSOR, IMAGE PROCESSING METHOD, GAME MACHINE AND RECORDING MEDIUM

TECHNICAL FIELD

This invention relates to a graphics processing technique for generating an image, analogous to one observed from a prescribed viewing point, of a virtual space which is defined by three-dimensional coordinates and which contains segments (terrain features, human figures moving about in the virtual space, and the like) disposed therein, and more particularly to a method for shifting this viewing point in an effective manner.

BACKGROUND OF THE INVENTION

Recent advances in computer technology and declines in prices have led to widespread consumer adoption of video game machines. Various games can be played on such video game machines by inserting the appropriate ROM cartridge or CD-ROM.

These types of games include "simulation" games. In simulation games, the game consists of a plurality of stages. The display image contains a designated movable segment which can be controlled by the player, other segments which move under the control of the program, and other segments depicting terrain features (hereinafter, the movable human figure or other player-controlled segment will be referred to as the "player-controlled character," and segments which move under the control of the program will be referred to as "enemy characters"). The player controls the player-controlled character to fight with the enemy characters to "beat" (complete a stage) the various stages.

Some simulation games of this type display an introductory screen which introduces the plurality of stages upon the issuance of a game start instruction, but these have several drawbacks.

For example, many conventional games of this type allow one to move through a page on the screen (called "scrolling") in order to view displays of all the stages. However, the information displayed together with the stage displays was limited to messages (Conventional Example 1).

Some simulation games which use a cursor to facilitate control allow one to move the cursor to a desired location within the display, at which point data describing the terrain feature segment displayed at that location is presented. However, only data for the location selected with the cursor is shown; relationships to terrain features adjacent to cursor are not indicated (Conventional Example 2).

Conventional simulation games also include those which use topographical mapping data. However, this topographical mapping data is defined two-dimensionally; none of the simulation games employ topographical mapping data defined three-dimensionally. Accordingly, no game processing exists which utilizes terrain features rendered as images capable of simulating events likely to happen in any ordinary three-dimensional terrain, for example, a character sustaining injury by falling from a cliff. Even if such a game exists, the orientation of an injury and the extent of an injury would be predetermined factors, and the inability for the nature of the injury to change in a manner dependent on the terrain results in a lack of realism (Conventional Example 3).

Furthermore, while some conventional simulation games vary the viewing point for creating the display, none of them allow the viewing point to be changed arbitrarily (Conventional Example 4).

As noted above, in conventional game design, the display is two-dimensionally defined, and the resulting display is unavoidably lacking in realism when compared to the real world, which is three-dimensional.

Accordingly, representation whereby the display in each stage is rendered on the basis of three-dimensionally-defined topographical mapping data, the position of the viewing point can be shifted vertically and horizontally, and the player is presented a more three-dimensional display would serve to facilitate understanding of terrain features.

It should be noted that defining terrain feature segments in three dimensions and allowing the viewing point to be positioned at any location within virtual space creates several new problems.

For example, where a enemy character or the like is hidden behind a terrain feature segment which is represented in three dimensions, the enemy character cannot be made visible unless the position of the viewing point is changed. This creates problems, unless the position of the viewing point is aligned with the player-controlled character. Specifically, directions for player-controlled character movement are assigned to control buttons on the input device (pad). This does not present a problem when the direction of the line of sight extending into the virtual space from the viewing point is aligned with the direction in which the player-controlled character is facing. However, if the direction of the line does is not aligned with the direction in which the player-controlled character is facing, proper control becomes impossible.

For example, let it be assumed that the assignment for the UP switch on the pad is such that when it is pushed, the player-controlled character moves FORWARD. This is not a problem where the viewing point is such that the player-controlled character is viewed from behind. Pushing the UP switch causes the player-controlled character to move in the z-axis direction in the viewing point coordinate system. With this control button assignment, however, if the viewing point is changed so that the player-controlled character is viewed from the side, pushing the UP switch will cause the player-controlled character to move in the z-axis direction, i.e., in the sideways direction with respect to the player-controlled character. Properly speaking, FORWARD should move the player-controlled character in the forward direction.

To summarize, where a three-dimensional simulation game is conducted using three-dimensionally-defined polygons or the like, the use of processing analogous to that for conventional two-dimensional simulation games makes control difficult and may diminish the interest of the game.

This invention was developed to address the problems noted earlier, and is intended to provide a graphics processing device which allows the viewing point in a three-dimensionally-defined virtual space to be shifted arbitrarily, and to present a suitable operating environment (Object 1).

This invention was developed to address the problems noted earlier, and is intended to provide a graphics processing device which allows information for the surroundings of the cursor-selected position to be displayed, and to present a suitable operating environment (Object 2).

This invention was developed to address the problems noted earlier, and is intended to account for the effects of a three-dimensionally-defined terrain feature on a player-controlled segment, and to present a suitable operating environment (Object 3).

This invention was developed to address the problems noted earlier, and is intended to align the orientation of a player-controlled segment in virtual space with the direction of the line of sight for visual field conversion, and to present a suitable operating environment (Object 4).

An embodiment of the invention provides a graphics processing device for generating a display wherein segments defined three-dimensionally within a virtual space are viewed from a viewing point located within the virtual space, comprising viewing point shifting means for shifting the viewing point over the predetermined three-dimensional paths established within the virtual space.

The segments are representations of terrain features, human figures, and the like, and are constructed from polygons, for example. Two-dimensional representations of the polygons observed from a viewing point in the virtual space are displayed. In contrast to moving through two dimensions, the paths are designed to allow movement while changing position in a third dimension direction (such as the height direction).

An embodiment of the invention provides a graphics processing device, wherein display locations for displaying predetermined messages are established along a path, and the viewing point shifting means displays messages at these display locations.

Locations for message display may include, for example, locations where enemy characters are positioned, locations of prescribed objects, location of characteristic terrain features such as cliffs or precipices, and other locations where information useful to the player in proceeding through the game should be placed. Messages may be displayed in a prescribed message window, for example. The message window need not be three-dimensional; a two-dimensional display may be used.

An embodiment of the invention provides a graphics processing device, wherein the path is configured such that each of the plurality of segments can be represented from different viewing point positions.

Examples of paths providing representation from different viewing point positions are:

paths providing an elevated viewing point position for commanding a wide view of flat terrain features;

paths providing a lowered viewing point position for providing an unobstructed view when encountering a view obstructed by valleys, forests, or other complex terrain features;

paths modifiable upon encountering a terrain feature that represents an obstacle, thereby allowing one to avoid the obstacle to view a desired terrain feature;

paths modifiable upon encountering a distinctive terrain feature or object, allowing the area to be rendered in close-up, for example, when looking up at an inclined surface, lowering the viewing point and approaching the inclined surface, or, when looking over a cliff, elevating the viewing point and approaching the cliff; and paths otherwise modifiable for achieving movie effects such as pan, zoom, and the like, for example, paths set up such that the camera can be adjusted continuously from extreme zoom-out to close-up in order to focus on a particular point.

An embodiment of the invention provides a graphics processing device, wherein the viewing point shifting means holds a reference point for the viewing point in a predetermined location when shifting the viewing point along a path.

An embodiment of the invention provides a game machine designed with a plurality of stages, comprising a graphics processing device whereby virtual terrain features are defined three-dimensionally within virtual space for each stage, and representations thereof are displayed as viewed from the viewing point.

An embodiment of the invention provides a graphics processing method for generating representations of segments defined three-dimensionally within virtual space displayed as viewed from the viewing point, comprising the step of shifting the viewing point over the predetermined three-dimensional paths established within the virtual space.

An embodiment of the invention provides a graphics processing method, wherein display locations for displaying predetermined messages are selected along a path, and the step for shifting the viewing point displays the messages at the display locations.

An embodiment of the invention provides a graphics processing device for generating representations of segments defined three-dimensionally within virtual space displayed as viewed from the viewing point, comprising cursor generation means for generating a cursor, cursor moving means for moving the cursor through operation by the player, data generating means for acquiring data concerning segments located peripherally around the cursor and generating display data, and data display means for producing data displays on the basis of the display data.

An embodiment of the invention provides a graphics processing device, wherein the data generating means, on the basis of conditions of motion applied to the cursor and data concerning segments located peripherally thereto, makes decisions as to whether cursor movement should be enabled, computing the load required for movement where movement is enabled, and the data display means displays a "movement not enabled" indicator in directions in which cursor movement is not enabled, as well as displaying a "movement enabled" indicator in directions in which cursor movement is enabled, together with the load required therefor.

An embodiment of the invention provides a graphics processing device, wherein the data generating means acquires attribute data concerning segments located peripherally around the cursor and generates display data, and the data display means displays the display data next to the segment(s) in question.

An embodiment of the invention provides a graphics processing device, wherein the cursor generating means changes the cursor display with reference to the attributes of the segments.

An embodiment of the invention provides a game machine designed with a plurality of stages, comprising a graphics processing device whereby virtual terrain features are defined three-dimensionally within virtual space for each stage, and a cursor is displayed in the display of each stage.

An embodiment of the invention provides a graphics processing method for generating a display of segments defined three-dimensionally within a virtual space and portrayed as viewed from a viewing point located within the virtual space, comprising a cursor moving step in which the cursor is moved through player control, a data generation step in which data pertaining to segments located peripherally around the cursor is acquired and display data is generated, and a data display step in which a data display is produced on the basis of the display data.

An embodiment of the invention provides a graphics processing device for generating a display of segments defined three-dimensionally within a virtual space and portrayed as viewed from a viewing point located within the virtual space, comprising attribute modification value generating means which, where a segment has moved, computes an attribute modification value for the segment on the basis of its status prior to moving, after moving, or both, and attribute modifying means for modifying the attributes of the segment on the basis of the attribute modification value.

An embodiment of the invention provides a graphics processing device, wherein the attribute modification value generating means computes the attribute modification value on the basis of the difference in distance of the segment prior to and after moving.

An embodiment of the invention provides a graphics processing device, wherein the attribute modification value generating means computes the attribute modification value on the basis of the status defined for the terrain feature segment located at the current position of a segment which has moved.

An embodiment of the invention provides a game machine designed with a plurality of stages, comprising a graphics processing device for defining virtual terrain features three-dimensionally within a virtual space and modifying segment attributes for each stage.

An embodiment of the invention provides a graphics processing method for generating a display of segments defined three-dimensionally within a virtual space and portrayed as viewed from a viewing point located within the virtual space, comprising an attribute modification value generating step wherein, where a segment has moved, an attribute modification value is computed for the segment on the basis of its status prior to moving, after moving, or both, and an attribute modifying step wherein the attributes of the segment are modified on the basis of the attribute modification value.

An embodiment of the invention provides a graphics processing device for generating a display of segments defined three-dimensionally within a virtual space and portrayed as viewed from a viewing point located within the virtual space, comprising segment moving means for moving prescribed segments through control by the player, coordinate alignment determining means for determining if the direction in which a designated segment in virtual space is facing is aligned with the direction of the line of sight extending from the viewing point, and association modifying means for modifying the association of the control direction instructed through player control and the direction of movement of the segment where the coordinate alignment determining means has determined that these are not aligned.

An embodiment of the invention provides a graphics processing device, further comprising control input type determining means for determining whether a control input by the player pertains to movement of a segment, and control direction setting means for setting the direction instructed through control by the player to a predefined direction in the event that it is determined by the control input type determining means that the input does not pertain to movement of a segment.

Cases where a determination that a particular control input does not pertain to movement of a segment would be made include, for example, specification of an action not directly related to movement of a segment but rather performed on a terrain feature, tree, rock, or other object in the virtual space, or of some modification of attributes (equipment, weapons, tools, etc.) including those of segments. Cases where a determination that a control input does not pertain to the virtual space would be made include, for example, operations performed in display screens not directly related to virtual space coordinates (such as game setting, segment setting, and other initial screens, setting screens for modifying parameters during the course of the game, message windows, and the like). "Predefined direction" refers to some direction defined with reference to the display screen (for example, UP, DOWN, LEFT, or RIGHT).

An embodiment of the invention provides a graphics processing device, further comprising control input reference determining means for determining whether a control input by the player is an operation to be performed on the display screen which displays the virtual space, and control direction setting means for setting the direction instructed through control by the player to a predefined direction in the event that it is determined by the control input reference determining means that the operation is not one to be performed on the display screen which displays the virtual space.

An embodiment of the invention provides a game machine designed with a plurality of stages and comprising a graphics processing device for defining virtual terrain features three-dimensionally within a virtual space for each stage, and for moving the segments.

An embodiment of the invention provides a graphics processing method for generating a display of segments defined three-dimensionally within a virtual space and portrayed as viewed from a viewing point located within the virtual space, comprising a segment moving step in which a designated segment is moved through control by the player, a coordinate alignment determining step in which a determination is made as to whether the direction in which the designated segment in virtual space is facing is aligned with the direction of the line of sight extending from the viewing point, and an association modifying step in which the association of the control direction instructed through player control and the direction of movement of the segment is modified in the event that the coordinate alignment determining means has determined that these are not aligned.

An embodiment of the invention provides a graphics processing method, further comprising a control input type determining step in which a determination is made as to whether a control input by the player pertains to movement of a segment, and a control direction setting step in which the direction instructed through control by the player is set to a predefined direction in the event that it is determined by the control input type determining means that the input does not pertain to movement of a segment.

An embodiment of the invention provides in a computer a machine-readable storage medium for storing a program which embodies a graphics processing method for generating a display of segments defined three-dimensionally within a virtual space and portrayed as viewed from a viewing point located within the virtual space, and which executes a step whereby the viewing point is shifted over predetermined three-dimensional paths established within the virtual space.

An embodiment of the invention provides in a computer a machine-readable storage medium for storing a program which embodies a graphics processing method for generating a display of segments defined three-dimensionally within a virtual space and portrayed as viewed from a viewing point located within the virtual space, and which executes a cursor movement step wherein the cursor is moved through control by the player, a data generation step wherein data pertaining to segments located peripherally around the cursor is acquired and display data is generated, and a data display step in which a data display is produced on the basis of the display data.

An embodiment of the invention provides in a computer a machine-readable storage medium for storing a program which embodies a graphics processing method for generating a display of segments defined three-dimensionally within a virtual space and portrayed as viewed from a viewing point located within the virtual space, and which executes an attribute modification value generating step wherein, where a segment has moved, an attribute modification value is computed for the segment on the basis of its status prior to moving, after moving, or both, and an attribute modifying step wherein the attributes of the segment are modified on the basis of the attribute modification value.

An embodiment of the invention provides in a computer a machine-readable storage medium for storing a program which embodies a graphics processing method for generating a display of segments defined three-dimensionally within a virtual space and portrayed as viewed from a viewing point located within the virtual space, and which executes a segment moving step in which a designated segment is moved through control by the player, a coordinate alignment determining step in which a determination is made as to whether the direction in which the designated segment in virtual space is facing is aligned with the direction of the line of sight extending from the viewing point, and an association modifying step in which the association of the control direction instructed through player control and the direction of movement of the segment is modified in the event that the coordinate alignment determining means has determined that these are not aligned.

Examples of storage media are floppy disks, magnetic tape, magnetooptical disks, CD-ROM, DVD, ROM cartridges, RAM memory cartridges equipped with battery packs, flash memory cartridges, nonvolatile RAM cartridges, and the like. "Storage medium" refers to a component capable of storing data (mainly digital data and programs) by some physical means and of enabling a computer, dedicated processor, or other processing device to perform prescribed functions.

Wired communications media such as phone lines, wireless communications media such as microwave circuits, and other communications media are included as well. The Internet is also included in this definition of communications media.

BRIEF DESCRIPTION OF THE DRAWINGS

FIG. 11 is a flow chart depicting the operation of the graphics processing device of Embodiment 2 of this invention;

BEST MODE FOR CARRYING OUT THE INVENTION

Preferred embodiments for carrying out the present invention are discussed below, referring to the appended drawings.

(Embodiment 1)

Figure 1:
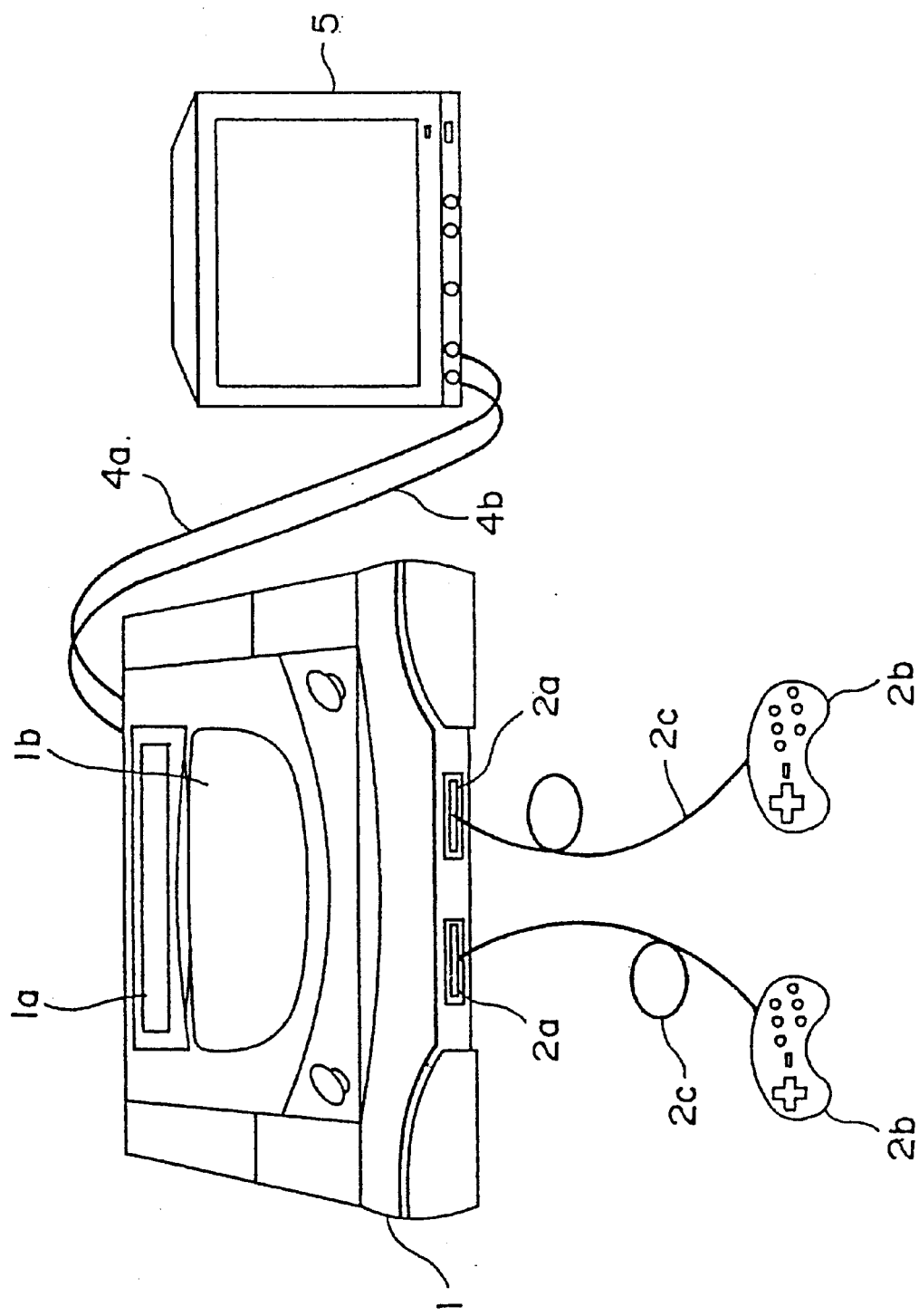
FIG. 1 is an exterior view of a game machine employing the graphics processing device of Embodiment 1 of this invention.

FIG. 1 is an exterior view of a video game machine employing the graphics processing device which pertains to Embodiment 1 of this invention. In the drawing, the video game console 1 has a shape approximating a box, and houses the boards for game processing and the like. Two connectors 2a are provided on the front panel of the video game console 1; the pads which serve as the input devices for game control (pads) 2b are connected to these connectors 2a through cables 2c. For two-player play, two pads 2b are used.

On the top of the video game console 1 are provided a cartridge I/F 1a for connecting a ROM cartridge and a CD-ROM drive 1b for reading CD-ROMs. While not shown, the back panel of the video game console 1 is provided with a video output terminal and an audio output terminal. The video output terminal is hooked up to the video input terminal of a television receiver 5 via a cable 4a. The audio output terminal is hooked up to the audio input terminal of a television receiver 5 via a cable 4b. With this type of video game machine, a player operates the pad 2b to play the game while viewing the screen shown on the television receiver 5.

Figure 2:
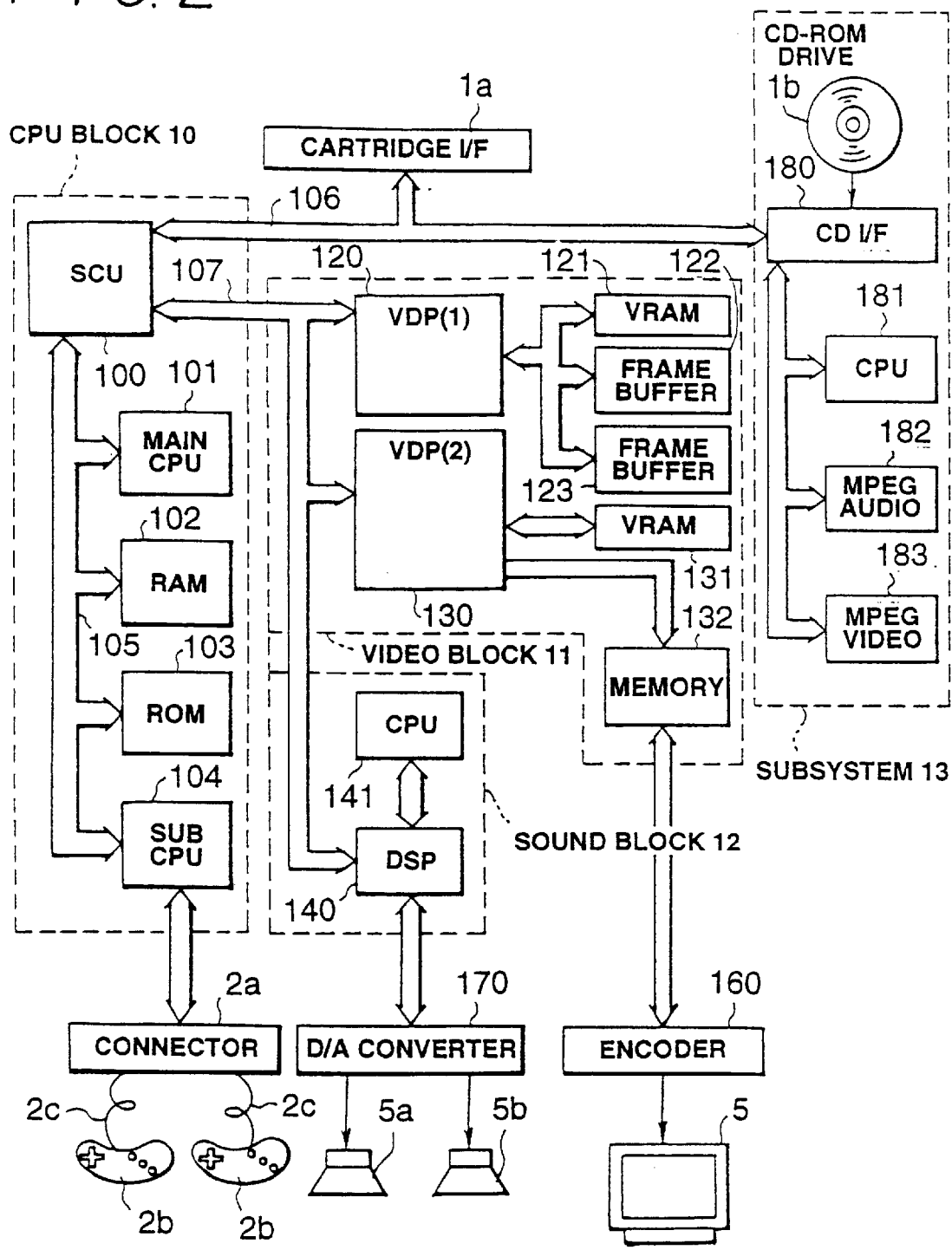
FIG. 2 is a functional block diagram of a game machine employing the graphics processing device of Embodiment 1 of this invention.

FIG. 2 is a block diagram showing the scheme of the TV game machine which pertains to Embodiment 1 of the invention. This graphics processing device comprises a CPU block 10 for controlling the entire device, a video block 11 for controlling game screen displays, a sound block 12 for generating effect sounds, and a sub-system 13 for reading CD-ROMS and the like.

The CPU block 10 comprises an SCU (system control unit) 100, a main CPU 101, RAM 102, ROM 103, a cartridge I/F 1a, a sub-CPU 104, a CPU bus 105, and so on.

The CPU block 10 comprises an SCU (system control unit) 100, a main CPU 101, RAM 102, ROM 103, a cartridge I/F 1a, a sub-CPU 104, a CPU bus 105, and so on.

The main CPU 101 is designed to control the entire device. This main CPU 101 incorporates a processing function (not shown) similar to a DSP (digital signal processor) and is designed for rapid execution of application software.

The RAM 102 is configured to serve as the work area for the main CPU 101. An initialization program for the initialization process and so on are written to the ROM 103, making it possible for the device 10 to boot up. The SCU 100 controls the buses 105, 106, and 107 to enable data exchange among the main CPU 101, the VDPs 120 and 130, the DSP 140, the CPU 141, and other components.

The SCU 100 is provided internally with a DMA controller, and is designed such that during the game, image data for the display elements which make up the segments (polygon data and the like) can be transferred to the VRAM in the video block 11.

The cartridge I/F 1a is designed to transfer program data and image data from the storage medium (provided in the form of a ROM cartridge) to the CPU block.

The sub-CPU 104 is called an SMPC (system manager & peripheral controller), and is designed to acquire control data from the peripheral devices 2b via the connector 2a shown in FIG. 1 in response to requests from the main CPU 101.

On the basis of control signals received from the sub-CPU 104, the main CPU 101 performs, for example, display control (changing character rotation, changing perspective, and other elements) on the game screen. The connectors 2a are designed to allow connections to any peripheral device such as a pad, joystick, keyboard, or the like. The sub-CPU 104 has the function of automatically recognizing the type of peripheral device plugged into the connectors 2a (console terminals) and acquiring control signals and the like in accordance with a particular communication mode corresponding to the type of peripheral device.

The video block 11 comprises a first VDP (video display processor) 120, VRAM (DRAM) 121, frame buffers 122 and 123, a second VDP 130, VRAM 131, and a frame memory 132.

The first VDP 120 houses a system register and is connected to VRAM (DRAM): 121 and to the frame buffers 122 and 123, and is designed to enable generation of segments (characters) consisting of polygons for the TV game. The second VDP 130 houses a register and color RAM, is connected to the VRAM 131 and the frame memory 132, and is designed to enable various processes such as rendering background images, priority (display priority)-based segment image data/background image data image synthesis, clipping, display color designation, and the like.

The VRAM 121 is designed to store polygon data (collections of apex point coordinates) for TV game character representation transferred from the main CPU 101 and to store conversion matrix data for shifting the visual field.

The frame buffers 122 and 123 are designed to hold the image data (generated in 16 or 8 bits per pixel format, for example) generated by the first VDP 120 on the basis of polygon data, etc.

The VRAM 131 is designed to store background image data supplied by the main CPU 101 through the SCU 100.

The memory 132 is designed to store final display data generated by the second VDP 130 through synthesis of texture-mapped polygon image data sent from the VDP 120 and background image data while applying display priority (priority).

The encoder 160 is designed to generate video signals by attaching sync frames and so on to the display data, and to output these to the TV receiver.

The sound block 12 comprises a DSP 140 for synthesizing sounds by the PCM format or FM format, and a CPU 141 for controlling this DSP 140. The DSP 140 is designed to convert audio signals to 2-channel signals through a D/A converter 170 and to output these to the two speakers 5a.

The sub-system 13 comprises a CD-ROM drive 1b, a CD I/F 180, MPEG AUDIO 182, MPEG VIDEO 183, and so on. This sub-system 13 has the function of reading application software provided in CD-ROM format, reproducing video, and so on. The CD-ROM drive 1b reads data from the CD-ROM. The CPU 181 is designed to control the CD-ROM drive 1b and to perform error correction on read data and other such processes. Data read out from a CD-ROM is delivered to the main CPU 101 through the CD I/F 180, bus 106, and SCU 100 and is used as the application software. The MPEG AUDIO 182 and MPEG VIDEO 183 are devices for restoring data which has been compressed in accordance with MPEG standards (Motion Picture Expert Group). By using the MPEG AUDIO 182 and MPEG VIDEO 183 to restore MPEG-compressed data written on a CD-ROM it is possible to reproduce the video images.

Figure 4:
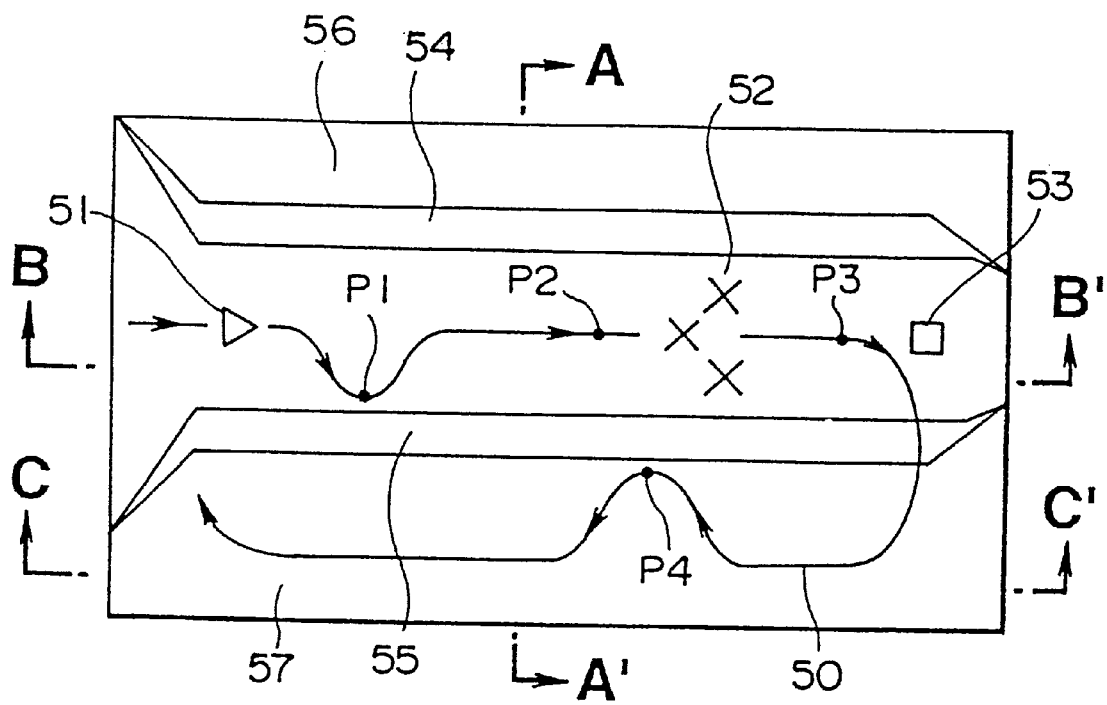
FIG. 4 is a plan view of a stage illustrative of the operation of Embodiment 1 of this invention.
Figure 5:
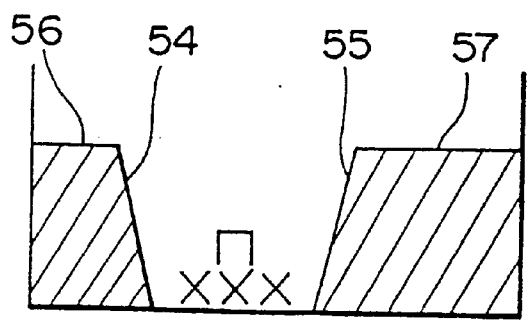
FIG. 5 is a sectional view of a stage illustrative of the operation of Embodiment 1 of this invention.

FIG. 4 is a drawing illustrating processing operations of the device of Embodiment 1 of this invention. FIG. 5 is a cross section of plane A—A in FIG. 4, viewed in the direction indicated by the arrows.

FIG. 4 is a plan view of a stage in the game containing terrain feature segments which have been generated within virtual space on the basis of three-dimensionally defined topographical data; the virtual space is viewed from above the horizontal plane in which these terrain features lie. In the drawing, 50 indicates the path over which the viewing point shifts (to facilitate understanding, the viewing point is discussed below in terms of a camera), 51 indicates a player-controlled character controlled by the player, 52 indicates a enemy character, 53 represents an obstacle (stone monolith) located on the course, 54 and 55 indicate sloped surfaces (cliffs), and 56 and 57 indicate plateaus. As may be discerned from the drawing, the game process flow in one in which the character 51 drives away enemy characters 52 blocking a path that is surrounded by sloped surfaces 54 and 55 to reach the exit located at the right in the drawing. Exiting through the exit leads the player to the next stage.

In this game machine, a stage is introduced by moving the camera along the shifting path 50 to show all the terrain features in the stage. During this process, prescribed messages are displayed in association with display images at points P1 through P4. For example, at point P1, the camera points up at the sloped surface 55 from below to allow the player to make a visual estimation of the steepness of the sloped surface, and a message such as "climbing up this sloped surface is tough" or "if you slip down this sloped surface you will get hurt" is displayed. A description of the enemy characters is provided at point P2 and a description of the obstacle 53 is provided at point P3. At point P4, in contrast to point P1, the camera points down the sloped surface, allowing the player to make a visual estimation of the steepness of the sloped surface. Points P1 through P4 are preset. Alternatively, arbitrary position setting through player control could be enabled.

The operation of the device of Embodiment 1 will be described with reference to the flow chart in FIG. 3. In Embodiment 1, a viewing point shifting method is provided during introduction of the simulation game; specifically, varying camera angles are employed to describe important features of the terrain. Most processing is done by the CPU 101.

During description of the terrain, the camera can move not only through the horizontal plane but also in the vertical direction to provide three-dimensional motion, thereby providing an impression of three-dimensional terrain, even for two-dimensional coordinate visual field-converted images. Demonstrations of "objects" actually encountered by the player-controlled character are also presented for the stage. The way in the camera moves may be set arbitrarily by the designer at the programming stage. The designated sites for message display may be set as well. When a message is displayed, camera motion temporarily stops. This is to allow the player to read the message. Camera motion resumes upon some control input from the player. The game of stage in question then starts in the terrain that has just been described.

Step ST1

The system goes into topographical mapping data check mode. Topographical mapping data check mode refers to a mode in which the entire stage can be observed to provide an understanding of conditions in each stage prior to play. Upon entering this mode, a predetermined camera path 50 is readied and the camera begins to move along this path. "Battles" between the player-controlled character and enemy characters do not occur in this mode.

Step ST2

Figure 6:
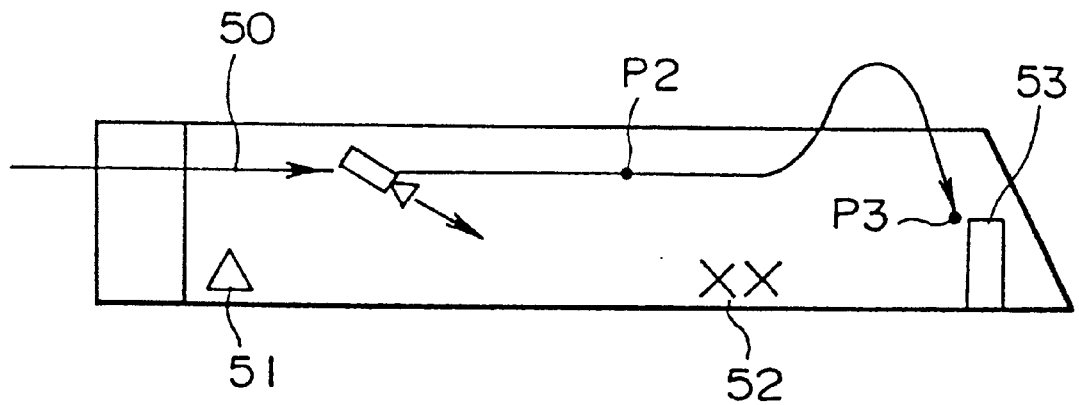
FIG. 6 is a diagram showing a camera shift path illustrative of the operation of Embodiment 1 of this invention.
Figure 7:
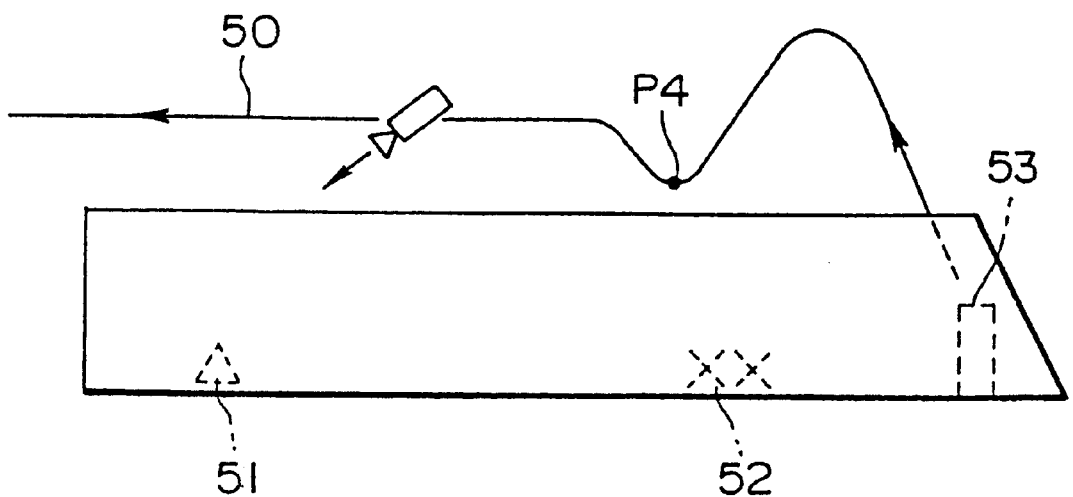
FIG. 7 is a diagram showing a camera shift path illustrative of the operation of Embodiment 1 of this invention.

The camera position begins to move. As depicted in FIG. 6 and FIG. 7, the camera starts to move from the left side in the drawings and proceeds until reaching the obstacle 53 located on the right side. It then turns around, passing over the plateau 57 and returning to the starting position. During this time the line of sight of the camera faces downward and towards the front. This camera direction has been preset, but can be freely modified or rendered selectable by the player.

As may be discerned from FIG. 6 and FIG. 7, the camera height can be changed during motion. For example, it can be raised immediately in front of the obstacle 53 and subsequent dropped down rapidly to close-up on the obstacle 53. When starting to move in the opposite direction, it can be raised to allow the entire terrain of the stage to be viewed; when looking down on a sloped surface 55, it can be dropped to closely approach the sloped surface. The scenes displayed through these various movements are full of variation and afford effective scenes that are very interesting. In this way, movie-like effects such as pan, zoom, and close-up can be produced by freely moving the camera within the virtual space.

Step ST3

Determinations as to whether to display messages are made as the camera is moving. Where a display is not indicated (NO), the system returns to step ST2 and the camera continues to move. On the other hand, where there is a message to be displayed (YES), the system proceeds to step ST4 and the message is displayed.

As described in the context of FIG. 4, points P1 through P4 for message display have been preset. Accordingly, in this example, four messages are displayed.

Step ST4

Figure 8:
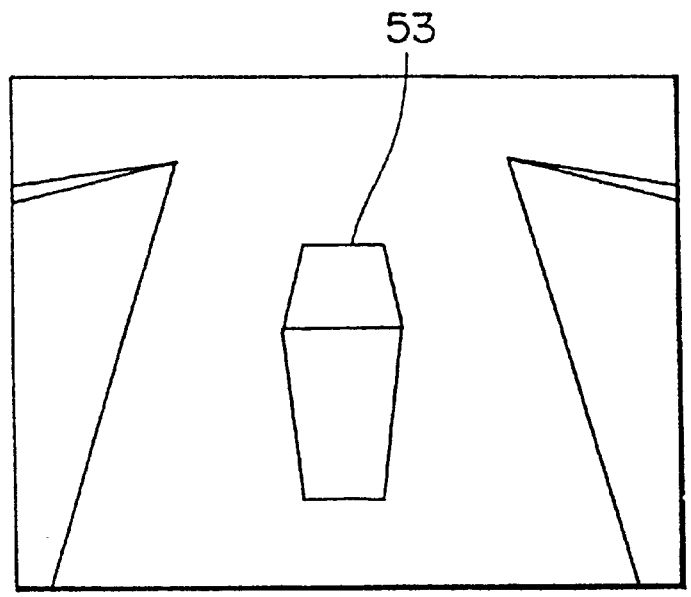
FIG. 8 is an example of a display screen illustrative of the operation of Embodiment 1 of this invention.
Figure 9:
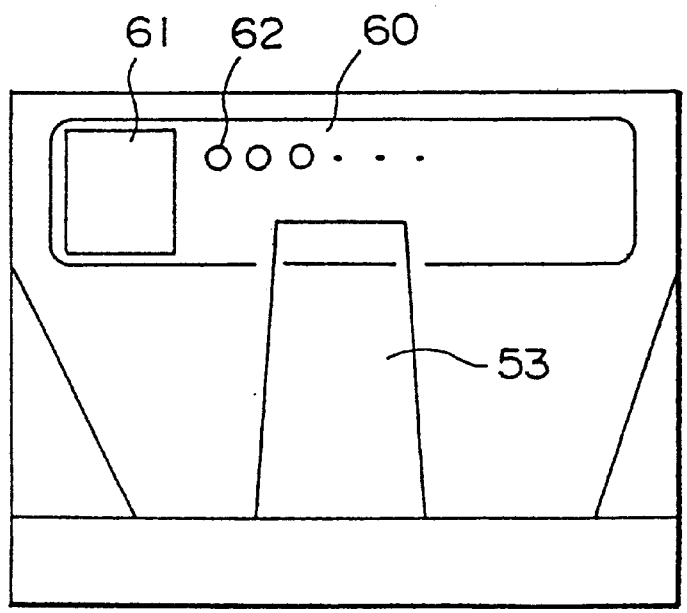
FIG. 9 is an example of another display screen illustrative of the operation of Embodiment 1 of this invention.

The message is displayed. For example, as the camera gradually approaches point P3, the camera pulls up rapidly to give a bird's-eye view like that depicted in FIG. 8. From this camera position, the overall size and shape of the obstacle 53 may be discerned. As the camera reaches point P3, a message is displayed through the determination made in step ST3. The camera position at this time is in proximity to the obstacle 53. As the obstacle 53 is shown in close-up, a message window 60 appears on the screen, and a subwindow 61 showing the face of the character appears therein. Various messages can be displayed in the message window 60, for example, "(character name) there seems to be some kind of trap here," or some similar message.

The window can be made transparent so as to avoid hiding the background scenery. Alternatively, multiple windows can be opened to enable a simulated conversation among a plurality of characters.

The camera does not move during the time that the message is being displayed. This allows the player time to discern the content of the message. When the player enters a prescribed command, the camera is released from the suspended state and resumes movement along the path 50. Alternatively, the message can be designed to display for a predetermined period of time without waiting for a command from the player.

Step ST5

A determination is made as to whether to terminate. A determination is made as to whether the finish point on the path 50 has been reached, that is, whether the player has returned to the starting point. If not finished (NO), the system returns to ST2. If finished (YES), the topographical mapping data check mode is terminated.

As noted above, the device of Embodiment 1 of this invention allows the player of a simulation game with a display of terrain segments represented three-dimensionally to move a camera in three-dimensional fashion in order to view the entire terrain, rather than simply scrolling through a display, thereby allowing the player to experience a sense of realism from the three-dimensionally constructed terrain. Additionally, the player can view terrain features from a multitude of camera positions during topographical mapping data check mode. Scene displays from camera positions that are not commonly employed (for example, an overall view from a very high position, looking upward from the ground, getting really close to a cliff) are also possible, producing a display that has impact and that stimulates the interest of the player. Additionally, the possibility of battles in three-dimensional space can be suggested by indicating the action space for the three-dimensionally constructed player-controlled character.

Figure 10:
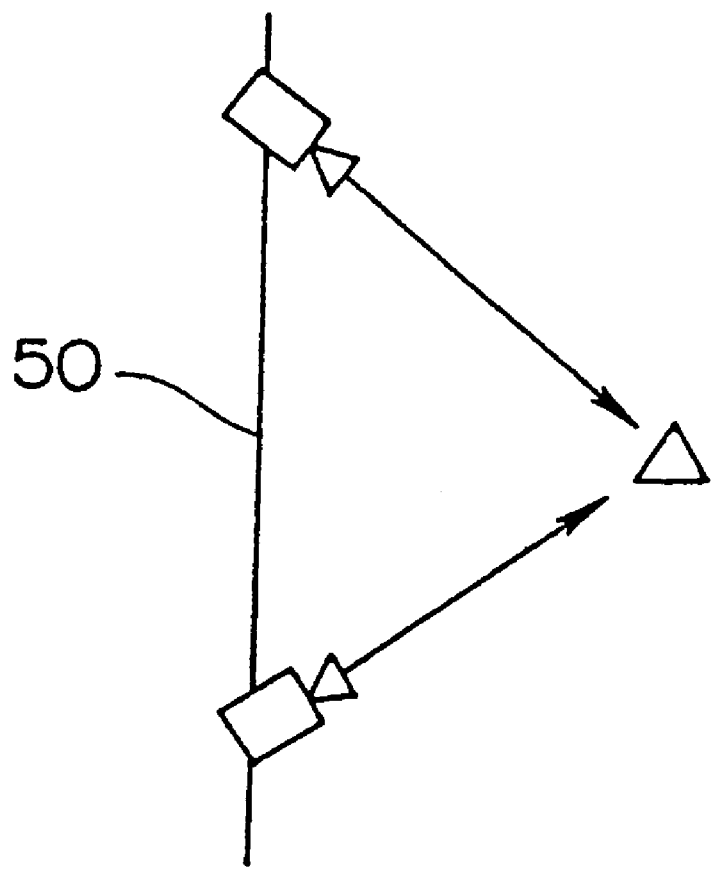
FIG. 10 is a diagram showing a camera shift path and the orientation thereof illustrative of the operation of Embodiment 1 of this invention.

In the foregoing description, the direction in which the camera faces (line of sight) was assumed to be fixed; however, the device of Embodiment 1 of this invention is not limited to this configuration. For example, as depicted in FIG. 10, it is possible to have the camera line of sight follow a designated target (shown as a triangle in the drawing) as the camera travels along the path 50. Where the target is a vehicle, for example, it is possible to produce a movie-like scene whereby the camera pans around to follow the motion of a vehicle approaching from in front as it passes by. Camera movement is not limited to the horizontal plane and may take place in a vertical plane.

(Embodiment 2)

The device of Embodiment 2 of this invention will now be described.

FIG. 11 is a simple flow chart showing the operation of this device. FIGS. 12 through 15 are diagrams illustrating the operation of this device.

Figure 12:
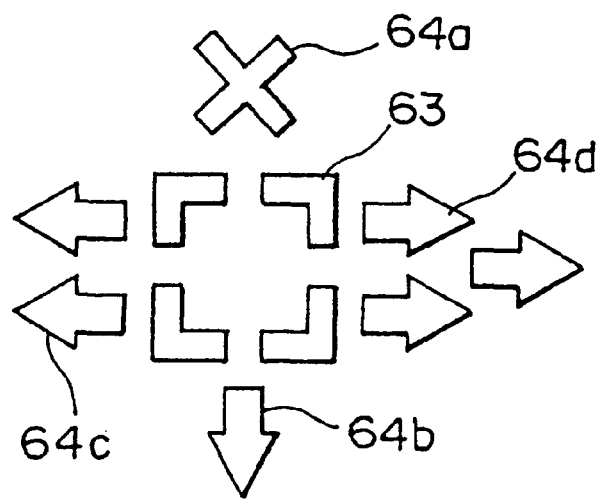
FIG. 12 is a plan view of a cursor and icons displayed by the graphics processing device of Embodiment 2 of this invention.

FIG. 12 shows the cursor 63 and the icons 64 displayed around its perimeter. The cursor 63 is shown on the basic screen display and on the movement select screen display. Displayed icon shapes comprise arrows and X's, and each of these has a particular meaning. An X icon 64a display indicates that the character cannot advance in the direction in which the X is located (upward in the drawing). A single arrow icon 64b display indicates that the character can move in the direction indicated by the arrow (downward in the drawing) and that the cost entailed in doing so (this refers to a parameter such as the point score required to continue game play) is equivalent to one arrow's worth. Similarly, a double arrow icon 64c or triple arrow icon 64d display respectively indicate that the associated movement costs two times and three times that of a single arrow.

Figure 13:
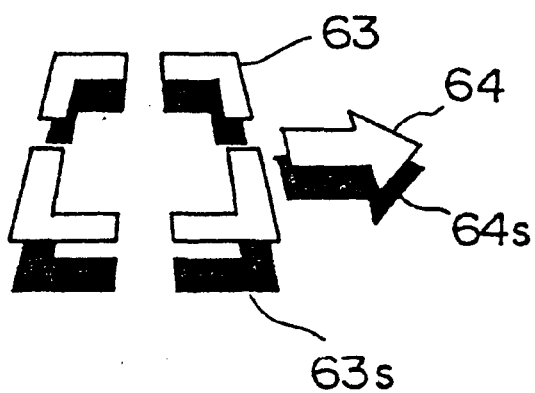
FIG. 13 is a plan view of another cursor and icons displayed by the graphics processing device of Embodiment 2 of this invention.

FIG. 13 is an example of another cursor 63 and icon 64 display format. In this drawing, shading 63s and 64s is depicted low the cursor 63 and the icons 64. This display is used when the character associated with the cursor has the ability to fly. Applying shading give the impression that the cursor is flying through the air, thereby calling attention to the functional characteristics with which the character is endowed. The cursor display can also be changed to reflect character function. For example, the cursor color could be blue or red depending on whether the sex of the player-controlled character is male or female. Another possibility would be to have a fat cursor for a powerful character and a thin cursor for a weak character.

Regarding the way in which shading is rendered, shadows may simulate light rays coming from some position in the virtual sky, or may be portrayed as conforming to the shapes of terrain features. Alternatively, shadows may be produced by simply adopting a double display for the cursor 63 and the icons 64.

Figure 14:
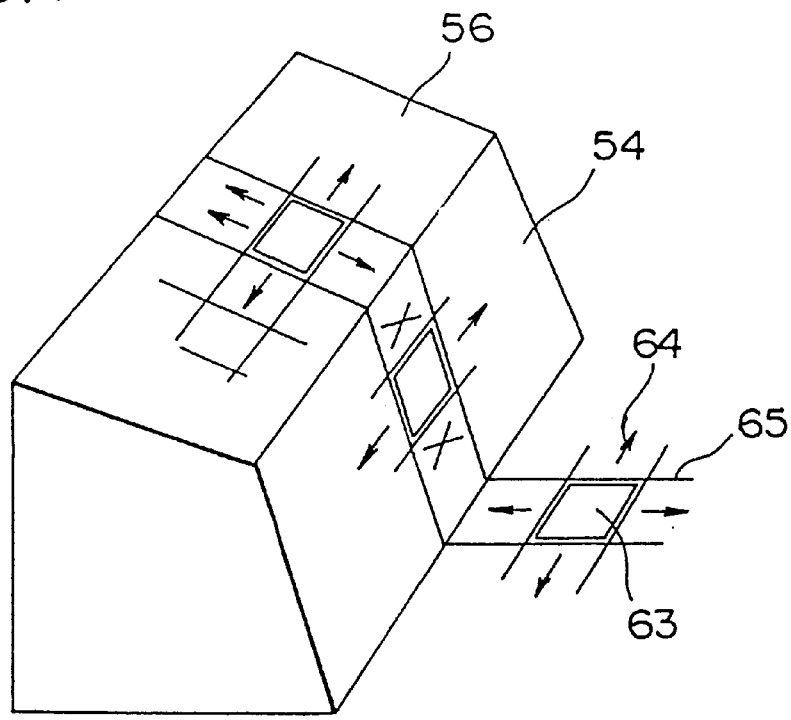
FIG. 14 is a perspective view of the cursor, icons, and grid in stage illustrative of the operation of Embodiment 2 of this invention.

FIG. 14 shows an example screen in which the cursor 63 is displayed. The cursor 63 moves over a grid 65 which reflects the shape of a terrain feature. As may be understood from the drawing, the icon display surrounding the cursor 63 changes depending on whether the ground over which the cursor 63 is positioned is flat ground, the sloped surface 54, or the plateau 56.

The operation will now be described referring to the flow chart in FIG. 11.

The device of Embodiment 2 of this invention relates to a cursor which is used in the context of a simulation game for controlling characters and the like, for determining the shape, qualities, and so on of a terrain feature at any location, and for displaying attribute information concerning enemy characters. It also brings up displays of data for terrain features located adjacently to the cursor. Specifically, the cursor provides information not only for a selected terrain feature but also for terrain features located adjacently to the terrain feature in question, thereby affording a display which facilitates understanding of relationships among continuous terrain features.

Step ST10

Data for the grid 65 adjacent to the cursor 63 is acquired. Terrain feature data for the position of the cursor 63 and data for surrounding terrain features is acquired, and a decision as to whether a certain movement is possible is made on the basis thereof. Where a movement is possible, the extent of the cost required is also computed. As shown in FIG. 14, the cursor 63 can be moved to various positions along the grid 65. When the cursor 63 is located over flat ground, conditions at the cursor and its surroundings are not significantly different. On the other hand, when the cursor 63 is located over the sloped surface 54, conditions change significantly in the direction of the slope, while conditions in the direction orthogonal to the direction of the slope do not change significantly. This affords information regarding surrounding terrain features, which change in various ways depending on the position of the cursor 63.

Step ST11

Grid direction conditions are computed. The cost entailed in moving is determined by the slope between the two points traversed. Slope can be expressed as the difference in height between the cursor 63 and height of an adjacent grid. The height of each grid is predetermined; a quantitative index thereof is created on the basis of a fixed reference value.

The relationship between the steepness of a slope and its height index can be classified as follows.

| Steepness of slope | Height index |
| --- | --- |
| (low) | 0–2 |
| (moderate) | 3–4 |
| (high) | 5–6 |
| (extreme) | 7–9 |
| (maximum) | 10 or above |

Climbing ability type is classified as follows with reference to the action capabilities with which a character is endowed. Numerical values represent action capabilities. "Extreme", "strong", "normal", and "weak" represent action settings for a player-controlled character; "strong", "normal", and "weak" represent walking strength.

| Steepness of slope | (low) | (medium) | (high) | (extreme) | (maximum) |
| --- | --- | --- | --- | --- | --- |
| extreme: | 1 | 1 | 1 | 2 | x |
| strong: | 1 | 1 | 2 | x | x |
| normal: | 1 | 2 | 4 | x | x |
| weak: | 1 | 3 | 6 | x | x |

An "x" indicates that movement is impossible. Arrows 64 are displayed with reference to these values.

Step ST12

Determination is made as to whether all grids have been completed. Where the cursor 64 has a square shape, as in this embodiment, a four-fold processing iteration is required.

Step ST13

On the basis of the conditions computed in Step ST11, the conditions are indicated by displaying icons around the cursor. For example, if the value in the previous example is "x", an "X" icon 64a is displayed, if "1", a single arrow icon 64b is displayed, if "2", a double arrow icon 64b is displayed, and if "3" or more, a triple arrow icon 64b is displayed. Icons comprising four or more arrows may be used as well.

In the foregoing description, the icons 64 for display around the cursor 63 are selected on the basis of the height difference (slope) with respect to the surrounding area; however, the invention is not limited thereto, and terrain conditions around the cursor may be represented, for example, through selection on the basis of the conditions of the ground in the surrounding area (rough terrain, grassy terrain, pavement, and so on). Selection may be made on the basis of both this type of condition and the height differential.

As noted above, Embodiment 2 of the present invention is designed such that information pertaining to the height differential between a location selected through the cursor and the adjacent terrain is designated and the results thereof are displayed around the cursor, affording a display which facilitates understanding of relationships with adjacent terrain features.

In addition, it may be readily determined whether movement from one terrain feature to another terrain feature is possible. Three-dimensional terrain relationships are easily discerned. An additional advantage is that the structure of the three-dimensional space around the cursor may be discerned to a certain extent as well.

Naturally, the cursor can be positioned arbitrarily by the player, and analogous correspondence when the terrain changes is possible.

Likewise, various modifications of cursor form besides that illustrated are possible. Any form indicating to the player the climbing power required for movement would be acceptable. For example, any form capable of displaying the required climbing power would be acceptable.

Figure 15:
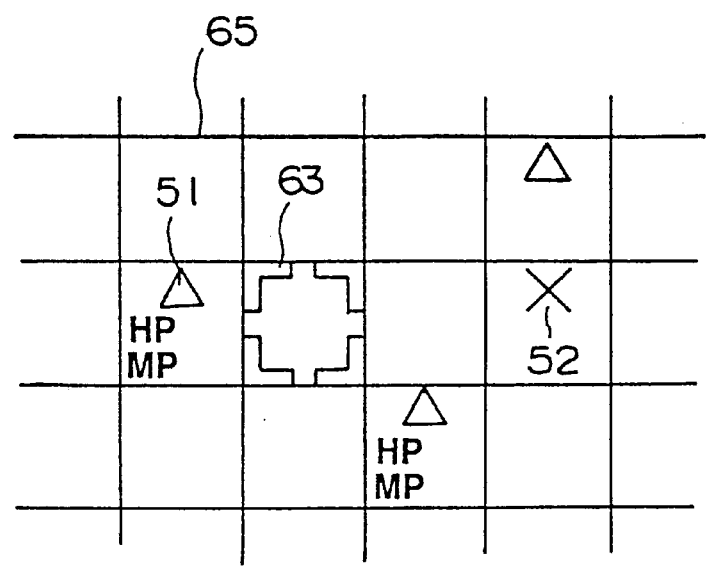
FIG. 15 is a plan view of the cursor, icons, and grid in stage illustrative of another operation of Embodiment 2 of this invention.

With regard to acquiring information regarding the area surrounding the cursor 63, a display like that depicted in FIG. 15 would also be possible. In the drawing, the human powers (HP) and magical powers (MP) possessed by a character 51 present in the area surrounding the cursor are displayed as numerical values (in the drawing, the actual numerical values are not shown). Information for characters present in the eight frames around the cursor 63 can be displayed there. Information for characters located further away (for example, the character 52 represented by the "X") is not displayed. Thus, the player can acquire information about characters in the surrounding area by moving the cursor to any desired position.

(Embodiment 3)

The device of Embodiment 3 of this invention will now be described.

The device of Embodiment 3 of this invention is used in simulation games in which terrain feature segments are constituted three-dimensionally; where a character or the like falls (refers to movement in a direction opposite the height up a particular terrain feature) during the game, it can vary the effects (damage) on a character and the direction of movement in accordance with this height differential. Specifically, the height differential between the starting point and adjacent terrain features is determined to select the direction of fall, and the amount of damage is varied in accordance with the height differential between the fall endpoint and the starting point.

Figure 16:
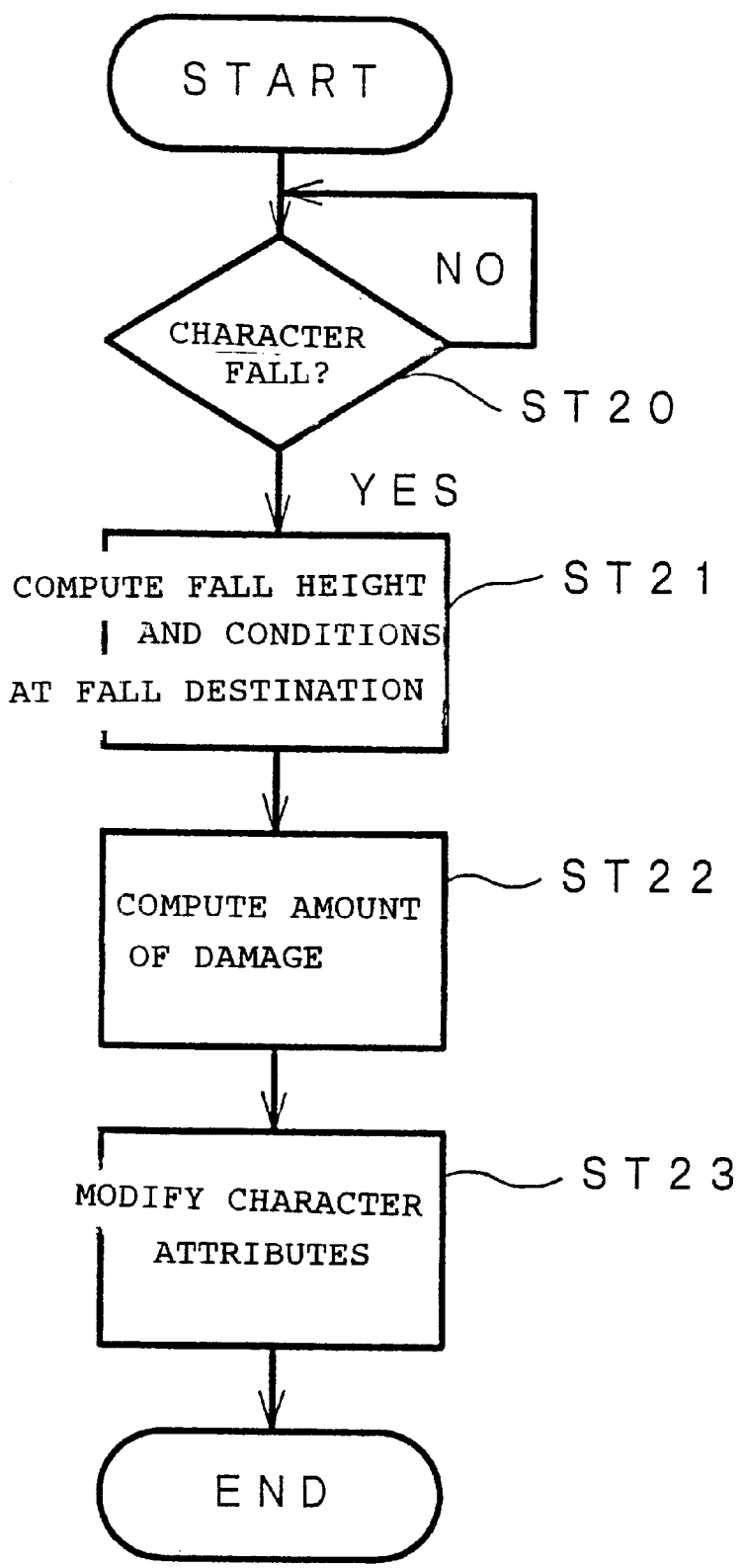
FIG. 16 is a flow chart depicting the operation of the graphics processing device of Embodiment 3 of this invention.

The operation of this device will be described referring to the simple flow chart in FIG. 16.

Step ST20

A determination is made as to whether the character should fall or not. For example, if a non-flying character (incapable of flight) is located on an extremely steep cliff (one with a steep slope), the character will fall off the cliff. The character will continue to fall (slide) until terrain with a more moderate incline is reached. Alternatively, if the terrain is defined as one with bad footing, such as a sloped surface, a determination that a fall has occurred will be made where movement to another location has occurred in opposition to control input by the player. The direction of the fall is selected on the basis of the conditions of the slope, the movement of the character just prior to the fall, and so on.

If a fall has occurred (YES), the system proceeds to Step ST21. The damage inflicted is proportional to the height of the fall.

Step ST21

The height of the fall and terrain conditions at the fall destination are computed. The difference (H2−H1) between the height of the character prior to the fall H2 and the height H1 after the fall is computed. An index S indicating conditions at the fall destination is also computed. This index S has been predefined in the topographical data. The index S will differ with rough terrain, grassy terrain, concrete, and so on. In general, the index S is greater (greater damage) the harder the ground and the more rugged it is.

Step ST22

The amount of damage is computed. The amount of damage is computed using the following equation, for example.

(amount of damage)=(height of fall * 4)

This condition is occurs when a flying character lands, or has been bounced into the air by an enemy.

Alternative, conditions at the fall destination may be taken into account through computation using the following equation, for example.

(amount of damage)=$k$(H2−H1)+S.

Here, k is a proportional coefficient, which may be constant or which may vary for individual stages or individual characters.

Step ST23

Character attributes are modified. The attributes of the character are modified to reflect the amount of damage computed in Step ST22. This involves reducing the human power HP of the character; where the damage is significant, the character may die (at which point further game play is disabled). For example, if a character should stand in a location where an indicator indicating the danger of falling is displayed, the character will fall and die unless the character is flying. There is no effect if the character is flying.

As described above, in accordance with Embodiment 3 of this invention, in the event that a character or the like should fall during the game, the height differential between the position prior to the fall and the position after the fall is computed, and the damage inflicted to the player and the direction of movement are changed.

Accordingly, unexpected accidents occurring during the game are presented in various ways, making the game more interesting. The player-controlled character can thus be damaged by elements other than attacks by enemy characters. Since the extent of damage can be increased or reduced through modification to topographical mapping data, the game designer is provided with increased latitude in terms of designing an interesting game. Since the player must take into consideration damage caused by falls in addition to attacks by enemy characters during play, the interest of the game is enhanced. Gravity and acceleration may be simulated in the representation of the fall, thereby enhancing the realism in the game.

(Embodiment 4)

The device of Embodiment 4 of this invention will now be described. In this embodiment, the direction of travel of the player-controlled character and the movement function assignments assigned to the pad are coordinated when the camera position changes.

Figure 3:
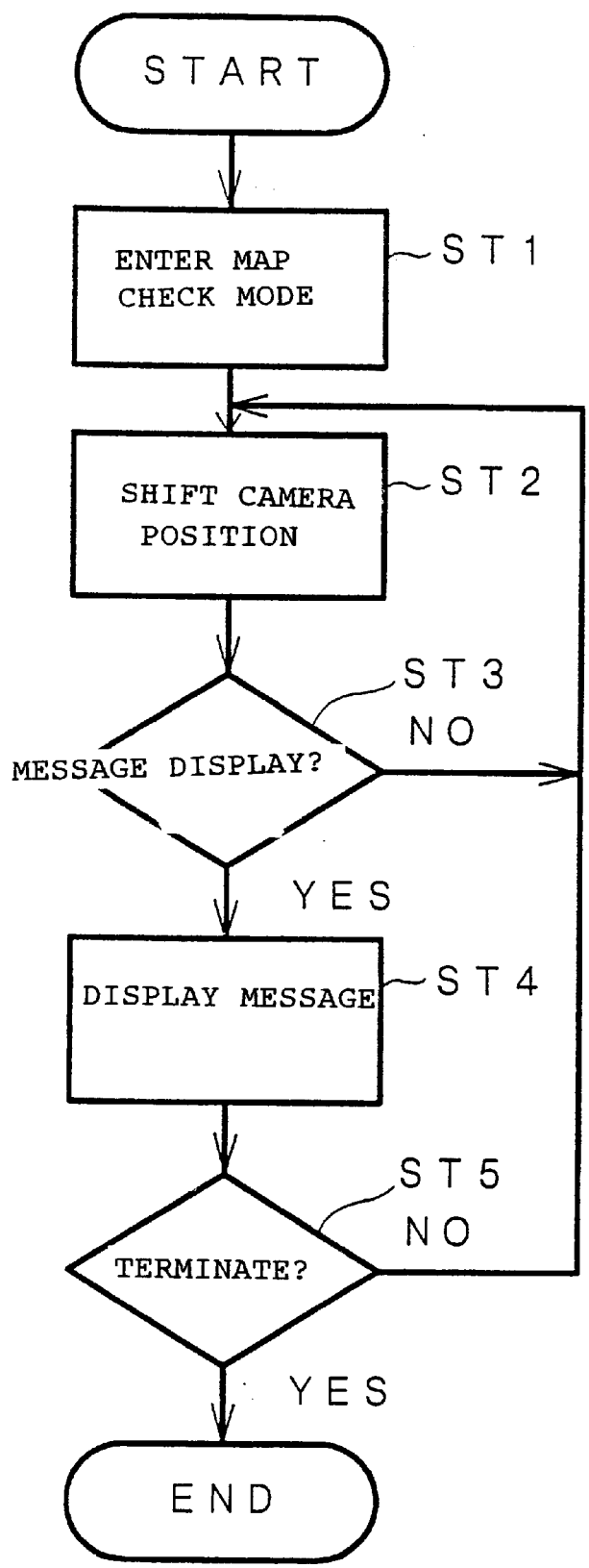
FIG. 3 is a flow chart illustrating the operation of the graphics processing device of Embodiment 1 of this invention.
Figure 18:
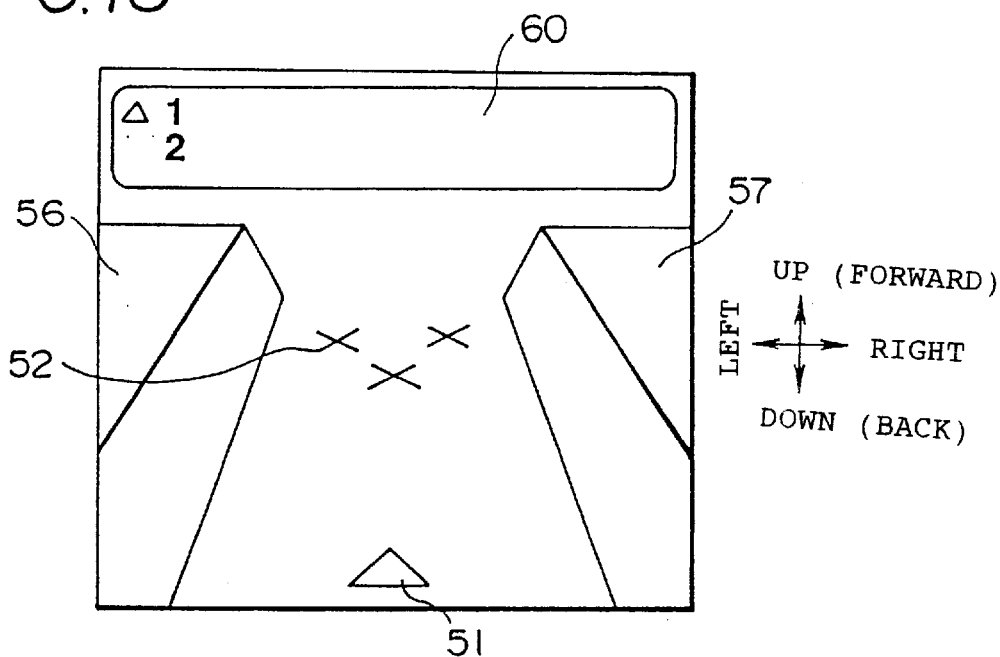
FIG. 18 shows an example of a display screen illustrative of the operation of Embodiment 4 of this invention.
Figure 19:
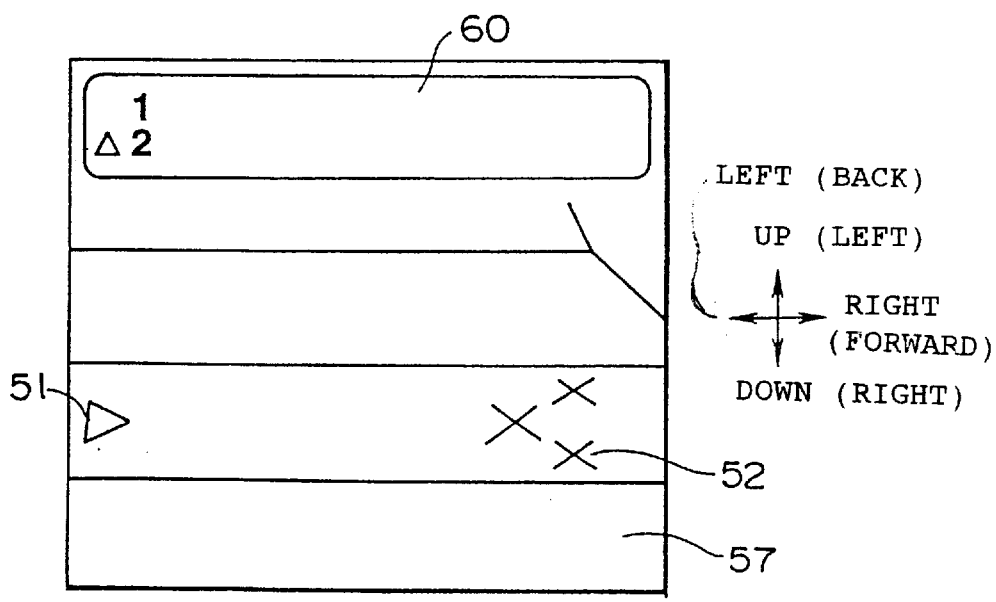
FIG. 19 shows an example of another display screen illustrative of the operation of Embodiment 1 of this invention.

FIG. 18 depicts the same game stage shown FIG. 3. In this display screen example, the camera is located towards the top of the entrance, and the camera direction is inclined downward toward the exit. FIG. 19 shows a display screen example of the same stage in which the camera is located above the plateau 57 in the sideways direction, with the camera direction facing the plateau 56 on the opposite side. In these drawings, a message window 60 is displayed together with the screen display. The player can selected any of a plurality of messages (in the drawing, there are two types, "1" and "2"). In the drawings, a triangle symbol represents message selection.

The arrows shown to the right in the drawings are provided to facilitate the description. Each arrow corresponds to a direction button on the pad 2b. The labels UP, DOWN, RIGHT, and LEFT indicate the directions assigned to the direction buttons on the pad 2b. The labels in parentheses, (FORWARD), (BACK), (LEFT), and (RIGHT), indicate the directions in which the character will move on the screen (i.e., within the virtual space of this stage) when direction buttons are pressed. The arrows in FIG. 18 indicate that the character will move FORWARD, BACK, LEFT, and RIGHT (as viewed from the direction in which the character is facing) within the virtual space when the UP, DOWN, RIGHT, and LEFT buttons are pressed respectively. Since moving the character FORWARD in the drawing causes it to advance upward on the screen, the associations are intuitive. The arrows in FIG. 19 indicate that the character will move RIGHT, LEFT, FORWARD, and BACK (as viewed from the direction in which the character is facing) within the virtual space when the UP, DOWN, RIGHT, and LEFT buttons are pressed respectively. Pushing the RIGHT button causes the character to advance toward the right of the screen, so the associations are intuitive.

Figure 17:
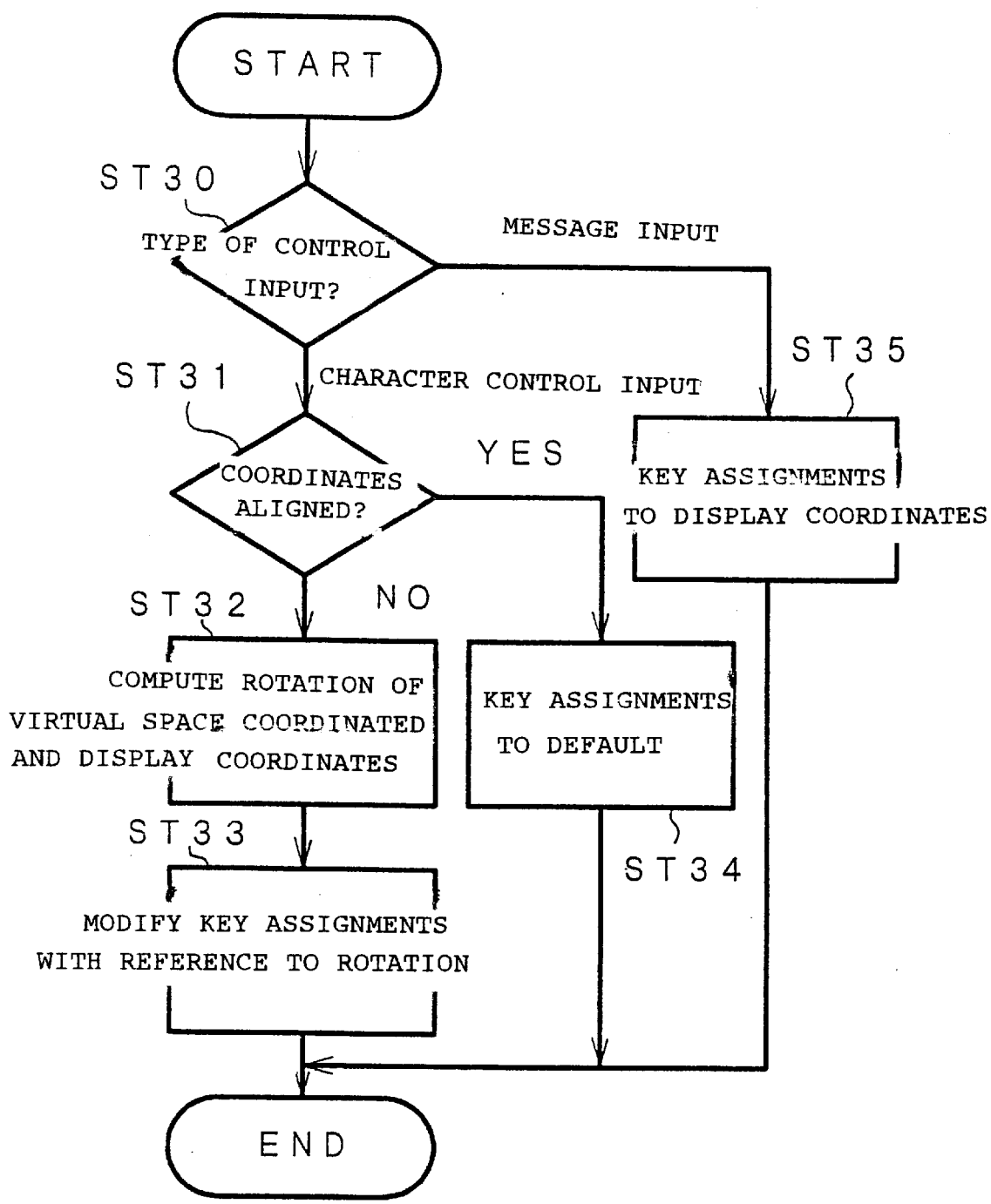
FIG. 17 is a flow chart depicting the operation of the graphics processing device of Embodiment 4 of this invention.

The associations for the arrows in FIG. 19 are created only when the process depicted in flow chart of FIG. 17 is performed. If this process is not performed, pushing the UP, DOWN, RIGHT, and LEFT direction buttons will result, for example, in the character advancing RIGHT, LEFT, DOWN, and UP within the virtual space as viewed from the direction in which the character is facing; these associations are not intuitive.

Simply aligning the direction buttons with the directions in which the character moves presents problems during message selection.

The message window 60 display is the same in both FIG. 18 and FIG. 19, so when direction button assignments are different, intuitive interface is lost. The flow chart shown in FIG. 17 takes this into consideration.

Next, the operation of the device of Embodiment 4 of this invention will be described referring to the flow chart in FIG. 17.

Step ST30

The type of control input is determined. This determination is made since key assignments differ between message inputs and character control inputs. If the input is a character control input, the system proceeds to Step ST31; if it is a message input, it proceeds to the Step ST35.

Step ST31

A determination is made as to whether coordinates are aligned. Specifically, a determination is made as to whether the direction in which the character is facing in the virtual space through which the character travels is aligned with or different than the direction of the line of sight from the viewing point. If the two are not aligned (NO), the system proceeds to Step ST32; they are aligned (YES), it proceeds to the Step ST34.

Step ST32

If the directions are not aligned, the angle formed by the direction in which the character is facing and the direction of the line of sight is computed. For example, in the case depicted in FIG. 18, it would be determined that the two directions are aligned, while in the case depicted in FIG. 19, it would be determined that the direction of the line of sight is rotated 90° to the left with respect to the direction in which the character is facing. Specifically, the direction of the line of sight reflects counter-clockwise rotation of the viewing point coordinate system around the axis representing height in the virtual space (the z axis), with the angle of rotation equal to 90°.

Step ST33

Key assignments are modified with reference to the angle of rotation. For example, the following modifications could be made.

| Direction button | UP | DOWN | RIGHT | LEFT |
|---|---|---|---|---|
| 90° | left | right | forward | back |
| 180° | back | forward | left | right |
| 270° | right | left | back | forward |
| 0°(reference) | forward | back | right | left |

When the angle of rotation is some intermediate value, associations are made on the basis of which of the aforementioned classifications assigned in 90° units is closest.

Step ST34

On the other hand, when the z axis is aligned, key assignments are set to default settings. For example, settings for a rotation angle of 0° are used.

Step ST35

When there is a message input, key assignments are set to default settings, since the message window 60 display is the same regardless of the angle of rotation. For example, settings for a rotation angle of 0° are used.

FIG. 17 depicts one example of a flow chart. Key assignment may be accomplished by other processes as long as message window operations are distinguished from character control when making the respective key assignments for the modes. For example, if there is no need to modify existing key assignments, it is not necessary to perform Steps ST33 and ST34. The order of Steps ST30 and ST31 may be reversed.

In this way, Embodiment 4 of this invention allows direction button assignments to be made on the basis of the angle formed by the direction the character is facing and the direction of the line of sight when the camera position changes, thereby allowing assignments to be modified to suit the player control perspective when the viewing point position has changed. Accordingly, intuitive operation can be continued without affecting the modified viewing point position.

In particular, in three-dimensionally-defined simulation games, the character is readily seen or difficult to see depending on camera position, so the ability to modify camera position is important. The present invention creates key assignment settings that offer intuitive control, so play can continue without any unnatural feel.

The player can modify the camera position to a position allowing the entire terrain to be readily discerned, and this modification of the camera position has no adverse effect on ease of control.

A distinction between "character control inputs" and "message inputs" was made in control input determinations, but the invention is not limited thereto. For example, determinations could be made regarding whether a control input relates to character movement or to the virtual space.

Where is it determined that a control input does not relate to character movement, operations not directly related to character movement, such as operations on terrain features, trees, rocks, and other display segments, or modification of attributes (equipment, weapons, tools, etc.) including those of segments, could be enabled.

Where is it determined that a control input does not relate to the virtual space, a display screen not directly related to virtual space coordinates (such as game setting, segment setting, and other initial setting screens, setting screens for modifying parameters during the course of the game, message windows, and the like) could be displayed.

INDUSTRIAL APPLICABILITY

As noted above, this invention allows the viewing point within a virtual space defined in three dimensions to be shifted arbitrarily, and affords a favorable game environment.

This invention further provides displays of information regarding the area surrounding the cursor-selected position, affording a favorable game environment.

This invention still further takes into account the effects of three-dimensionally-defined terrain features on player-controlled segments, affording a favorable game environment.

This invention still further coordinates the orientation of a player-controlled segment in virtual space with the direction of the line of sight for modifying the visual field, affording a favorable game environment.

In short, it provides ease of operation and an appealing display screen, contributing significantly to the interest of the game.

What is claimed is:

1. A graphics processing device for generating representations of segments defined three-dimensionally within virtual space displayed as viewed from the viewing point, comprising:

cursor generation means for generating a cursor;

cursor moving means for moving the cursor through operation by a player;

data generating means for acquiring data concerning segments located peripherally around the cursor and generating display data; and data display means for producing data displays on the basis of the display data.

2. A graphics processing device according to claim 1, wherein the data generating means, on the basis of conditions of motion applied to the cursor and data concerning segments located peripherally thereto, makes decisions as to whether cursor movement should be enabled, computing the load required for movement where movement is enabled, and the data display means displays a "movement not enabled" indicator in directions in which cursor movement is not enabled, as well as displaying a "movement enabled" indicator in directions in which cursor movement is enabled, together with the load required therefor.

3. A graphics processing device according to claim 1, wherein the data generating means acquires data concerning segments located peripherally around the cursor and generates display data, and the data display means displays the display data next to the segment(s) in question.

4. A graphics processing device according to any of claims 1 through 3, wherein the cursor generating means changes the cursor display with reference to attributes associated with the data of the segments.

5. A game machine designed with a plurality of stages, a graphics processing device according to any of claims 1 through 3, wherein one or more virtual terrain features are defined three-dimensionally within virtual space for each of the plurality of stages, and a cursor is displayed in the display of each of the plurality of stages.

6. A graphics processing method for generating a display of segments defined three-dimensionally within a virtual space and is portrayed as viewed from a viewing point located within the virtual space, comprising:

a cursor moving step in which the cursor is moved through player control;

a data generation step in which data pertaining to segments located peripherally around the cursor is acquired and display data is generated; and a data display step in which a data display is produced on the basis of the display data.

7. A machine-readable storage medium, provided in a computer, for storing a program which embodies a graphics processing method for generating a display of segments defined three-dimensionally within a virtual space and portrayed as viewed from a viewing point located within the virtual space, and which executes a cursor movement step wherein the cursor is moved through control by the player, a data generation step wherein data pertaining to segments located peripherally around the cursor is acquired and display data is generated, and a data display step in which a data display is produced on the basis of the display data.

* * * * *

UNITED STATES PATENT AND TRADEMARK OFFICE
CERTIFICATE OF CORRECTION

PATENT NO.     : 6,500,069 B1
DATED          : December 31, 2002
INVENTOR(S)    : Noriyoshi Ohba et al.

It is certified that error appears in the above-identified patent and that said Letters Patent is hereby corrected as shown below:

<u>Title page,</u>
Item [54], delete the title in its entirety and insert therefor -- GRAPHICS PROCESSING DEVICE, GRAPHICS PROCESSING METHOD, GAME MACHINE, AND STORAGE MEDIUM --.

<u>Column 20,</u>
Line 10, after "stages,", insert -- comprising: --.

Signed and Sealed this

Twenty-seventh Day of January, 2004

JON W. DUDAS
*Acting Director of the United States Patent and Trademark Office*